United States Patent
Allen et al.

(10) Patent No.: US 11,760,256 B1
(45) Date of Patent: Sep. 19, 2023

(54) MULTI-DIRECTIONAL LIGHT PROPAGATION AND CONTROL USING TWO COLORED LAYERS

(71) Applicant: GM GLOBAL TECHNOLOGY OPERATIONS LLC, Detroit, MI (US)

(72) Inventors: Jodi Mary Jean Allen, Lake Orion, MI (US); Kevin Begert, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/158,067

(22) Filed: Jan. 23, 2023

(51) Int. Cl.
| | |
|---|---|
| B60Q 1/26 | (2006.01) |
| F21S 43/14 | (2018.01) |
| B60Q 1/28 | (2006.01) |
| F21S 43/20 | (2018.01) |
| F21Y 115/10 | (2016.01) |

(52) U.S. Cl.
CPC ............. *B60Q 1/2607* (2013.01); *B60Q 1/28* (2013.01); *F21S 43/14* (2018.01); *F21S 43/255* (2018.01); *B60Q 2400/30* (2013.01); *F21Y 2115/10* (2016.08)

(58) Field of Classification Search
CPC .............. B60Q 1/00–2607; B60Q 1/28; B60Q 2400/30; F21S 43/14–19; F21S 43/255
See application file for complete search history.

(56) References Cited

U.S. PATENT DOCUMENTS 10,202,074 B2 * 2/2019 Kumada ................ B60K 37/00

* cited by examiner

*Primary Examiner* — Jason M Han
(74) *Attorney, Agent, or Firm* — CANTOR COLBURN LLP

(57) ABSTRACT

Aspects of the disclosure include optical systems that use two colored layers for multi-directional light propagation and control. An exemplary optical system can include a first cavity having a first light source and a second cavity having a second light source. A colored coating is positioned between the first cavity and the second cavity. The colored coating includes a bezel layer, a top color set layer, and a bottom color set layer. The colored coating serves as a wall between the first cavity and the second cavity.

20 Claims, 4 Drawing Sheets

MULTI-DIRECTIONAL LIGHT PROPAGATION AND CONTROL USING TWO COLORED LAYERS

INTRODUCTION

The subject disclosure relates to product manufacture and design, and particularly to multi-directional light propagation and control using two colored layers.

Manufacturers use a variety of tools and processes to design the final appearance and finish of a manufactured part. In-Mold Decoration (IMD), for example, refers to a collection of techniques for decorating plastic molded parts with unique designs and colors by molding a resin onto a back surface of a decorative film within an injection mold. In-Mold Dye Transfer (IMDTR) is a variety of IMD for printing or otherwise transferring a desired image, design, pattern, color, etc. onto a film. The film is typically made of plastic and includes a hard coat layer, a graphics layer, and an adhesive. The printed film is guided into an opened mold cavity by passing the printed film along a polymer carrier or foil feeding system mounted onto an injection molding press. The printed film is held in place by vacuum ports in the mold cavity.

In the mold, the printed film is pressed, physically or via vacuum, onto the mold cavity surface. Sensors within the mold and injection molding press read printed alignment marks or indicators placed around the printed film to ensure an accurate alignment. The mold is closed and heated, liquid plastic is injected into the mold cavity. The adhesive layer printed on the film is activated by the heat of the melted plastic, releasing the decorative image (or design, pattern, color, etc.) on the printed film and transferring it to the molded plastic surface. The transferred image binds with the plastic surface resulting in a permanently decorated molded plastic part. Because decoration of the mold piece is done during the molding cycle, post-mold decoration and other secondary processes are eliminated. IMD and IMDTR processes have been greatly improved and simplified due to the incorporation of highly automated equipment and design systems. IMD allows for decorated parts to be produced more efficiently and faster, with a large degree of design flexibility (e.g., multiple colors and textures at once), than traditional post-mold processes.

SUMMARY

In one exemplary embodiment an optical system for multi-directional light propagation and control can include a first cavity having a first light source and a second cavity having a second light source. A colored coating is positioned between the first cavity and the second cavity. The colored coating includes a bezel layer, a top color set layer, and a bottom color set layer. The colored coating serves as a wall between the first cavity and the second cavity.

In some embodiments, the first light source is a daytime running light having a first color and the second light source is a turn signal having a second color different than the first color. In some embodiments, the first light source and the second light source each include a light emitting diode (LED).

In addition to one or more of the features described herein, in some embodiments, the bezel layer is made of a clear plastic, the top color set layer includes a first dye, and the bottom color set layer includes a second dye.

In some embodiments, the second cavity and the second light source together define a backlight for the bezel layer.

In some embodiments, the bezel layer, the top color set layer, and the bottom color set layer are tinted for one of color shifting and reflectivity.

In some embodiments, a surface of the bezel layer is patterned. In some embodiments, the surface includes a shark tooth pattern.

In another exemplary embodiment a vehicle includes a headlamp unit. The headlamp unit can include a first cavity having a first light source and a second cavity having a second light source. The headlamp unit can further include a colored coating between the first cavity and the second cavity. The colored coating can include a bezel layer, a top color set layer, and a bottom color set layer. The colored coating serves as a wall between the first cavity and the second cavity.

In yet another exemplary embodiment a method for providing an optical system having multi-directional control can include forming a first cavity having a first light source and forming a second cavity having a second light source. The method can further include forming a colored coating between the first cavity and the second cavity. The colored coating includes a bezel layer, a top color set layer, and a bottom color set layer. The colored coating serves as a wall between the first cavity and the second cavity.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
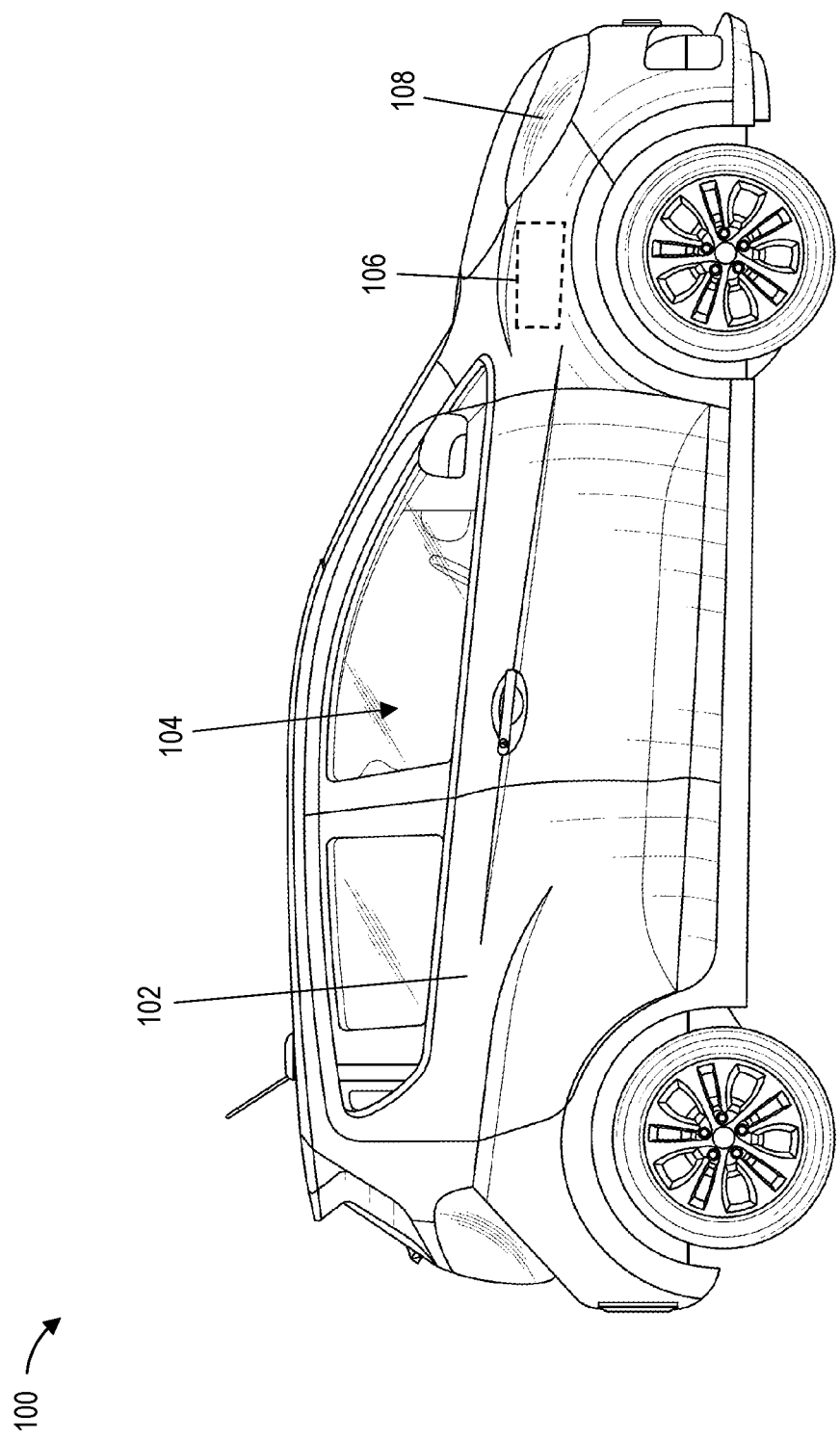
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

As will be detailed herein, the vehicle 100 further includes a headlamp unit 108. The headlamp unit 108 is shown for ease of illustration and discussion only. It should be understood that the configuration, location, size, arrangement, etc., of the headlamp unit 108 is not meant to be particularly limited, and all such configurations (including configurations having a plurality of headlamp units located at the front, rear, and side portions of the vehicle 100) are within the contemplated scope of this disclosure. Moreover, while the present disclosure is discussed primarily in the context of a headlamp unit of a vehicle, aspects described herein can be similarly incorporated within any multi-cavity optical system, and all such configurations are within the contemplated scope of this disclosure.

Figure 2:
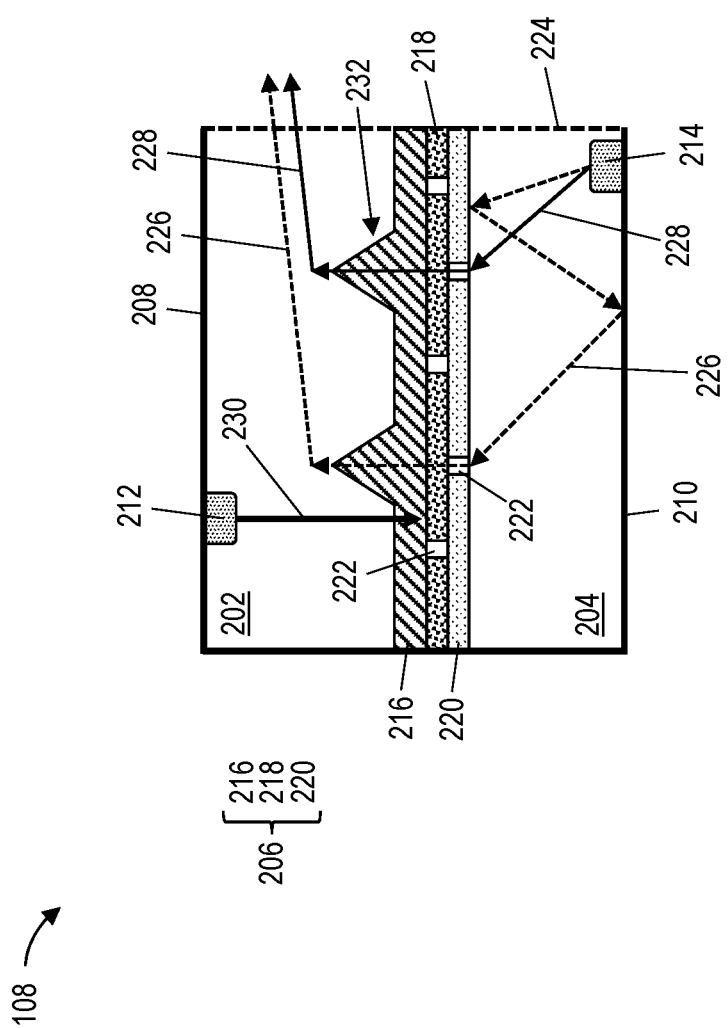
FIG. 2 is a cross-sectional view of a headlamp unit in accordance with one or more embodiments.

In some embodiments, the headlamp unit 108 includes a lens situated over a cavity (refer to FIG. 2). In some configurations, portions of the headlamp unit 108 are coated with a colored coating having two or more distinct colored layers (not separately shown in FIG. 1). The colored layers can be selected to block or transmit or otherwise modify light from the surface of the lens. In some embodiments, the two colored layers are formed using In-Mold Dye Transfer (IMDTR), although other coloring techniques, including pad printing, painting, inking, etc. can be used to create the two colored layers. Typically, IMDTR coatings control light from only a single direction (i.e., from a light source through the lens).

This disclosure introduces a new optical system having two colored layers placed between two cavities and a method of using the same to control light propagation, color, transmission, reflection, absorption, and direction within and through the cavities. Advantageously, positioning the two colored layers between two (or more) cavities allows the use of each colored layer to control light from a respective cavity (i.e., two directional, or total, light control). In some embodiments, each of the colored layers can be separately tuned (e.g., structurally or chemically modified) as needed for precise two directional light control.

The two colored layers can be used as part of an IMDTR coating to enable an IMDTR coating having two directions of light control. In other words, by placing an IMDTR coating having two colored layers between two cavities of an optical system the light in both cavities can be controlled. While two colored layers configured according to one or more embodiments can enable improved IMDTR coatings, other applications, including part design processes that rely on pad printing and painting (i.e., non-IMDTR processes), can similarly benefit by incorporating a colored coating having two or more colored layers.

Optical systems constructed in accordance with one or more embodiments offer several technical advantages over prior solutions. In particular, coatings having two colored layers as described herein can be positioned to serve as two-directional light control and as a wall between the respective cavities of a light source (e.g., headlamp unit) simultaneously. For example, in many optical systems, two cavities with individual light sources already exist natively, such as in a headlamp unit that contains a daytime running light (DRL) and a nearby turn signal. Typically, between these lighting elements exists two walls, one dedicated to the turn signal, and one dedicated to the DRL function. In some embodiments, the two colored layers described herein can meet all of the wall requirements for each subsystem, while allowing transmission, reflection, and absorption as desired. Other advantages are possible.

For example, in some embodiments, coatings (e.g., IMDTR coatings) described herein can include a plurality of ink layers. In some embodiments, the first layer(s) will define the transmission, reflection, and absorption of light for the first cavity, while the last layer(s) will define the transmission, reflection, and absorption of light for the other cavity. In some embodiments, the coatings described herein can include 10 or more ink layers to satisfy arbitrarily complex light control requirements. In some embodiments, the coating can be tinted to provide a visible color shift as light propagates through a cavity.

Moreover, optical systems having two colored layers and cavities configured according to one or more embodiments enable unique appearances that cannot be achieved otherwise (including applications having single cavity IMDTR coatings) but also provides more free control of the surrounding adjacent cavities. For example, a bottom cavity can be lined with a white coating to help propagate light, resulting in a more homogenous appearance, while a top cavity in the same application could be lined with a color selected to absorb extra light in an otherwise hot spot (e.g., an area of brighter relative intensity) within the lighting module.

FIG. 2 illustrates a cross-sectional view of a headlamp unit 108 in accordance with one or more embodiments. The headlamp unit 108 can be included within the vehicle 100 of FIG. 1, although other lighting applications are within the contemplated scope of this disclosure. In some embodiments, the headlamp unit 108 includes a first cavity 202, a second cavity 204, and a two colored coating 206 between the first cavity 202 and the second cavity 204.

In some embodiments, the two colored coating 206 is an IMDTR coating, although other embodiments are within the contemplated scope of this disclosure. In some embodiments, one or more sidewalls 208 of the headlamp unit 108 serve as a wall(s) for the first cavity 202. In some embodiments, the two colored coating 206 and one or more sidewalls 210 of the headlamp unit 108 serve as a wall(s) for the second cavity 204.

In some embodiments, the first cavity 202 includes a first light source 212. In some embodiments, the second cavity 204 includes a second light source 214. While the light sources 212, 214 are not meant to be particularly limited, the first light source 212 and the second light source 214 can include one or more light emitting diodes (LEDs) and/or micro LEDs formed on a surface of a backplane (also referred to as a substrate). In addition, or alternatively, the first light source 212 and the second light source 214 can include any combination of incandescent (e.g., incandescent bulbs), luminescent (e.g., compact fluorescent lamps), and gas discharge light sources (e.g., sodium-vapor lamps, neon lamps). In some embodiments, the first light source 212 includes a DRL and the second light source 214 includes a turn signal.

The headlamp unit 108 is shown having a particular arrangement of light sources 212, 214 (here, one per cavity) for ease of discussion and illustration only. It should be understood, however, that the number, size, configuration, orientation, centerline-to-centerline pitch, color, etc., of the light sources 212, 214 can vary as required for a given lighting application.

The light sources 212, 214 can include micro LEDs formed from a range of known suitable material(s), such as, for example, semiconductor materials (e.g., silicon, gallium nitride, indium gallium nitride, etc.) and sapphire, depending on the desired emission color of the respective micro LED. In some embodiments, the first light source 212 is made of a material selected to provide a first color (e.g., red, green, blue, white, etc.), while the second light source 214 is made of a material selected to provide a second color (e.g., red, green, blue, white, etc.). The first color and the second color can be the same, or different colors.

In some embodiments, the micro LED(s) include several stacked layers, such as an indium gallium nitride/gallium nitride (InGaN/Gan) stack formed on a silicon or sapphire substrate to produce blue and green devices (not separately shown). The backplane can include electrical connections (not separately shown) configured to individually control each of the micro LED(s) using electrical signals (i.e., by passing a driving voltage to a respective micro LED).

In some embodiments, the two colored coating 206 includes a bezel layer 216, a top color set layer 218, and a bottom color set layer 220. Advantageously, the bezel layer 216, the top color set layer 218, and the bottom color set layer 220 can be separately tuned via color and material selection, depending on the lighting requirements of the first cavity 202 and the second cavity 204. In some embodiments, the bezel layer 216 is made of a clear plastic (as used herein, a "clear" material refers to an optically clear transparent or partially transparent material that allows transmission of at least 90%, 95%, 99% of incoming light).

In some embodiments, the top color set layer 218 is a first inking layer and the bottom color set layer 220 is a second inking layer. In some embodiments, the top color set layer 218 is dyed or otherwise colored depending on the color of the light emitted from the first light source 212 and a desired observed color from the headlamp unit 108 (e.g., a color of a daytime running light) and the bottom color set layer 220 is dyed or otherwise colored depending on the color of the light emitted from the second light source 214 and another desired observed color from the headlamp unit 108 (e.g., a color of an indicator light). For example, in applications where the first light source 212 is a white DRL, the top color set layer 218 can include a black ink layer patterned with one or more clear areas 222 to maximize brightness. In another example, in applications where the second light source 214 is a turn signal, the bottom color set layer 220 can include a white ink layer patterned with one or more clear areas 222 to tune the wavelengths (color) of light emitted from the second light source 214 that can pass through an outer lens 224 of the headlamp unit 108. The position, number, configuration, size, etc. of the clear areas 222 can themselves be designed as desired depending on the needs of a given application. The clear areas 222 can be isolated (e.g., as shown) and/or continuous (e.g., forming a pattern(s)). Moreover, while shown as having a single top color set layer 218 and a single bottom color set layer 220 for ease of illustration and discussion, the number of layers (including both colored and non-colored layers) need not be so limited. In some embodiments, the top color set layer 218 and/or the bottom color set layer 220 can each include 10 or more ink layers, each having their own color and distribution of clear areas 222. In this manner, control over the light emitted from the first light source 212 and the second light source 214 can be separately fine tuned.

To illustrate these light control properties, consider a first light ray 226 emitted from the second light source 214. As shown in FIG. 2, the first light ray 226 is initially reflected and/or scattered upon contact with the bottom color set layer 220, prior to leaving through one of the clear areas 222 and being transmitted through the outer lens 224 (i.e., the ray is reflected and/or scattered then transmitted). Meanwhile, a second light ray 228 emitted from the second light source 214 passes through one of the clear areas 222 and is transmitted through the outer lens 224 without being reflected and/or scattered (i.e., the ray is transmitted). To illustrate further, consider a third light ray 230 emitted from the first light source 212. As shown in FIG. 2, the third light ray 230 is absorbed by the top color set layer 218 (i.e., the ray is not transmitted). Depending on material selection, the top color set layer 218 may later re-emit the third light ray 230 as one or photons (not separately shown) and/or the absorption may result in heating the top color set layer 218. By modifying the materials and/or colors of the bezel layer 216, the top color set layer 218, and the bottom color set layer 220, the behavior (reflection, scattering, transmission, absorption, etc.) of the light rays can be tuned as needed. Notably, modifying the materials and/or colors of the top color set layer 218 will modify the observed light from the first cavity 202, while modifying the materials and/or colors of the bottom color set layer 220 will modify the observed light from the second cavity 204.

As further shown in FIG. 2, in some embodiments, a surface 232 of the bezel layer 216 can be patterned as desired for a given application. While shown as having a particular pattern (here, a "shark tooth" pattern), the patterning of the surface 232 of the bezel layer 216 is not meant to be particularly limited, and all possible optics configurations are within the contemplated scope of this disclosure.

In some embodiments, the second cavity 204 and the second light source 214 together define a backlight for the bezel layer 216. Advantageously, configuring the two colored coating 206 with the top color set layer 218 and the bottom color set layer 220 allows light propagation and control from the second cavity 204. In some embodiments, the two colored coating 206, the top color set layer 218, and/or the bottom color set layer 220 can be tinted to provide color shifting or higher reflectivity, as needed.

Figure 3:
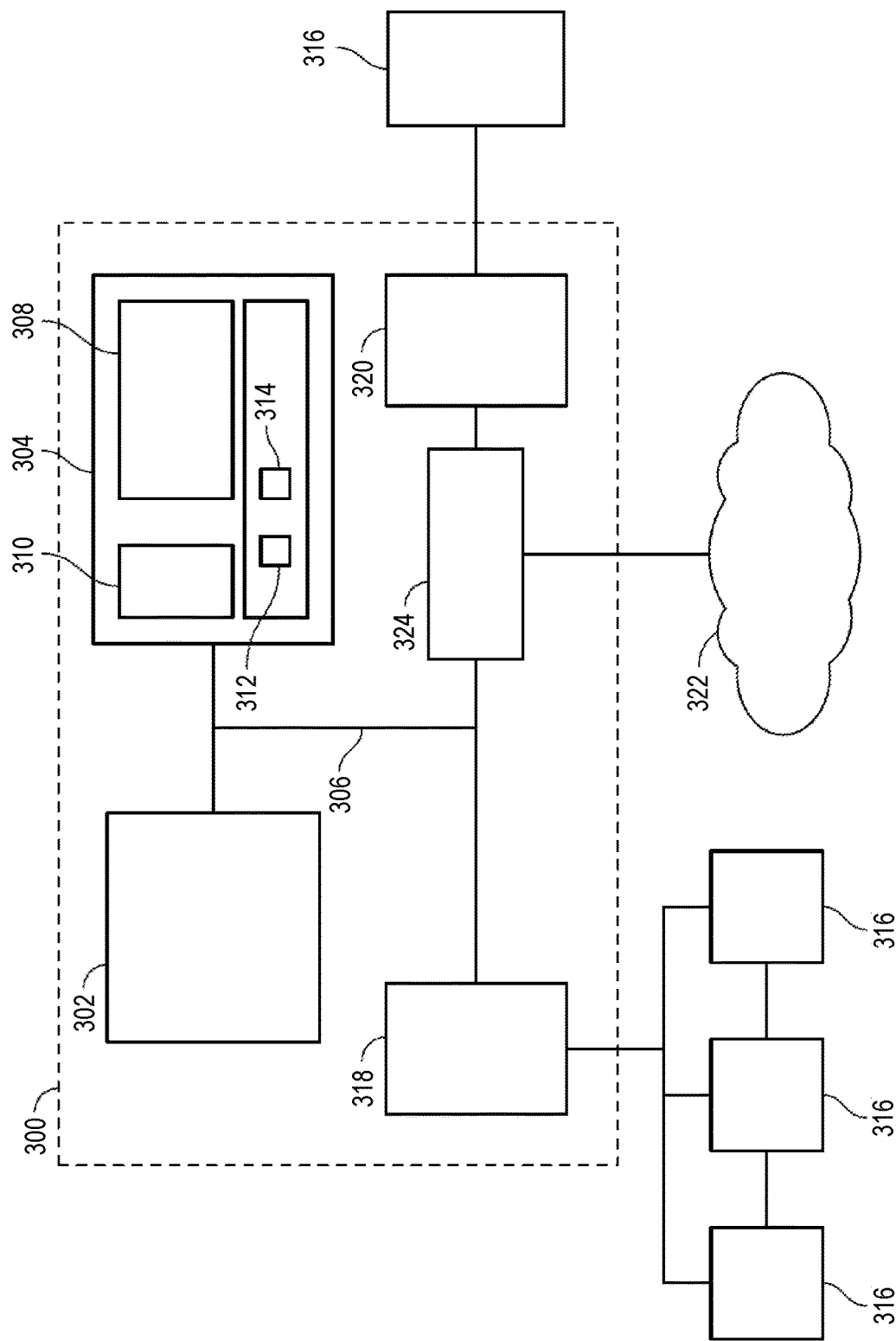
FIG. 3 is a computer system according to one or more embodiments.

FIG. 3 illustrates aspects of an embodiment of a computer system 300 that can perform various aspects of embodiments described herein. In some embodiments, the computer system 300 can be incorporated within or in combination with an optical system (e.g., the headlamp unit 108 of FIG. 2). The computer system 300 includes at least one processing device 302, which generally includes one or more processors for performing a variety of functions, such as, for example, controlling driving voltages to one or more LED(s) (e.g., the first light source 212 and/or the second light source 214). More specifically, the computer system 300 can include the logic necessary to direct a backplane (not separately shown) to activate or deactivate the individual LED(s) or any subset of the LED(s).

Components of the computer system 300 include the processing device 302 (such as one or more processors or processing units), a system memory 304, and a bus 306 that couples various system components including the system memory 304 to the processing device 302. The system memory 304 may include a variety of computer system readable media. Such media can be any available media that is accessible by the processing device 302, and includes both volatile and non-volatile media, and removable and non-removable media.

For example, the system memory 304 includes a non-volatile memory 308 such as a hard drive, and may also include a volatile memory 310, such as random access memory (RAM) and/or cache memory. The computer system 300 can further include other removable/non-removable, volatile/non-volatile computer system storage media.

The system memory 304 can include at least one program product having a set (e.g., at least one) of program modules that are configured to carry out functions of the embodiments described herein. For example, the system memory 304 stores various program modules that generally carry out the functions and/or methodologies of embodiments described herein. A module or modules 312, 314 may be included to perform functions related to control of a turn signal, head lights, parking brake, fog lights, etc. The computer system 300 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to stop charging and/or otherwise isolate one or more cells of a battery pack of the vehicle 100.

The processing device 302 can also be configured to communicate with one or more external devices 316 such as, for example, a keyboard, a pointing device, and/or any devices (e.g., a network card, a modem, vehicle ECUs, etc.) that enable the processing device 302 to communicate with one or more other computing devices. Communication with various devices can occur via Input/Output (I/O) interfaces 318 and 320.

The processing device 302 may also communicate with one or more networks 322 such as a local area network (LAN), a general wide area network (WAN), a bus network and/or a public network (e.g., the Internet) via a network adapter 324. In some embodiments, the network adapter 324 is or includes an optical network adaptor for communication over an optical network. It should be understood that although not shown, other hardware and/or software components may be used in conjunction with the computer system 300. Examples include, but are not limited to, microcode, device drivers, redundant processing units, external disk drive arrays, RAID systems, and data archival storage systems, etc.

Figure 4:
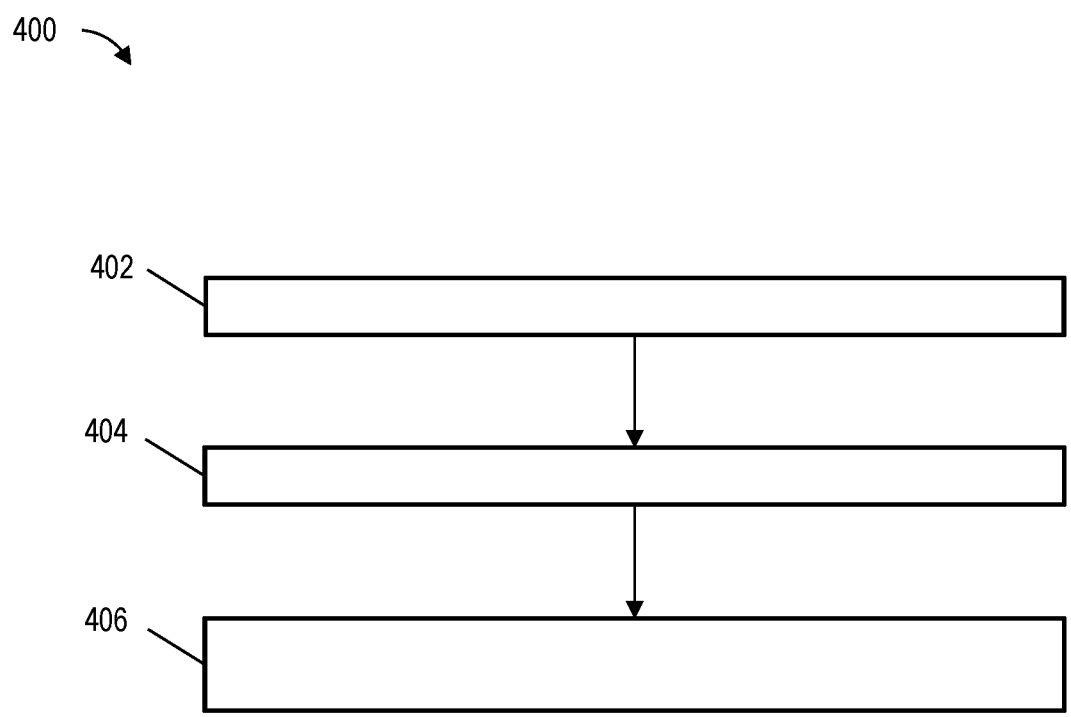
FIG. 4 is a flowchart in accordance with one or more embodiments.

Referring now to FIG. 4, a flowchart 400 for leveraging colored coatings having two or more colored layers for light propagation and control is generally shown according to an embodiment. The flowchart 400 is described in reference to FIGS. 1 to 3 and may include additional steps not depicted in FIG. 4. Although depicted in a particular order, the blocks depicted in FIG. 4 can be rearranged, subdivided, and/or combined.

At block 402, a first cavity is formed. The first cavity includes a first light source. At block 404, a second cavity is formed. The second cavity includes a second light source. In some embodiments, the first light source is a daytime running light having a first color and the second light source is a turn signal having a second color different than the first color. In some embodiments, the first light source and the second light source each comprise a light emitting diode (LED).

At block 406, a colored coating is positioned between the first cavity and the second cavity. The colored coating includes a bezel layer, a top color set layer, and a bottom color set layer. The colored coating serves as a wall between the first cavity and the second cavity.

In some embodiments, the bezel layer is made of a clear plastic, the top color set layer includes a first dye, and the bottom color set layer includes a second dye. The first dye and the second dye can include one or more of the same, or different color(s).

In some embodiments, the second cavity and the second light source together define a backlight for the bezel layer. In some embodiments, the bezel layer, the top color set layer, and the bottom color set layer are tinted for one of color shifting and reflectivity. In some embodiments, a surface of the bezel layer includes a shark tooth pattern, although other patterns are possible.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An optical system comprising:
   a first cavity comprising a first light source for an external vehicle illumination;
   a second cavity comprising a second light source for an external vehicle illumination; and
   a colored coating between the first cavity and the second cavity, the colored coating comprising a bezel layer, a top color set layer, and a bottom color set layer, wherein the colored coating serves as a wall between the first cavity and the second cavity.

2. The optical system of claim 1, wherein the first light source comprises a daytime running light having a first color and the second light source comprises a turn signal having a second color different than the first color.

3. The optical system of claim 2, wherein the first light source and the second light source each comprise a light emitting diode (LED).

4. The optical system of claim 1, wherein the bezel layer comprises a clear plastic, the top color set layer comprises a first dye, and the bottom color set layer comprises a second dye.

5. The optical system of claim 1, wherein the second cavity and the second light source together define a backlight for the bezel layer.

6. The optical system of claim 5, wherein the bezel layer, the top color set layer, and the bottom color set layer are tinted for one of color shifting and reflectivity.

7. The optical system of claim 1, wherein a surface of the bezel layer comprises a shark tooth pattern.

8. A vehicle comprising:
   a headlamp unit comprising:
      a first cavity comprising a first light source;
      a second cavity comprising a second light source; and
      a colored coating between the first cavity and the second cavity, the colored coating comprising a bezel layer, a top color set layer, and a bottom color set layer, wherein the colored coating serves as a wall between the first cavity and the second cavity.

9. The vehicle of claim 8, wherein the first light source comprises a daytime running light having a first color and the second light source comprises a turn signal having a second color different than the first color.

10. The vehicle of claim 9, wherein the first light source and the second light source each comprise a light emitting diode (LED).

11. The vehicle of claim 8, wherein the bezel layer comprises a clear plastic, the top color set layer comprises a first dye, and the bottom color set layer comprises a second dye.

12. The vehicle of claim 8, wherein the second cavity and the second light source together define a backlight for the bezel layer.

13. The vehicle of claim 12, wherein the bezel layer, the top color set layer, and the bottom color set layer are tinted for one of color shifting and reflectivity.

14. The vehicle of claim 8, wherein a surface of the bezel layer comprises a shark tooth pattern.

15. A method for multi-directional light control in an optical system, the method comprising:
   forming a first cavity comprising a first light source for an external vehicle illumination;
   forming a second cavity comprising a second light source for an external vehicle illumination; and
   forming a colored coating between the first cavity and the second cavity, the colored coating comprising a bezel layer, a top color set layer, and a bottom color set layer, wherein the colored coating serves as a wall between the first cavity and the second cavity.

16. The method of claim 15, wherein the first light source comprises a daytime running light having a first color and the second light source comprises a turn signal having a second color different than the first color.

17. The method of claim 16, wherein the first light source and the second light source each comprise a light emitting diode (LED).

18. The method of claim 15, wherein the bezel layer comprises a clear plastic, the top color set layer comprises a first dye, and the bottom color set layer comprises a second dye.

19. The method of claim 15, wherein the second cavity and the second light source together define a backlight for the bezel layer.

20. The method of claim 19, wherein the bezel layer, the top color set layer, and the bottom color set layer are tinted for one of color shifting and reflectivity.

* * * * *